United States Patent Office 2,813,854
Patented Nov. 19, 1957

2,813,854
COPPER-CONTAINING DISAZO DYESTUFFS

Ernst Iselin, Dornach, and Walter Wehrli, Riehen, Switzerland, assignors, by mesne assignments, to Saul & Co., Newark, N. J., as nominee of Fidelity Union Trust Company, executive trustee under Sandoz Trust No Drawing. Application January 16, 1956,
Serial No. 559,131

Claims priority, application Switzerland March 18, 1955

4 Claims. (Cl. 260—148)

The present invention relates to new valuable copper-containing disazo dyestuffs.

More particularly, the invention has especial relation to copper-containing disazo dyestuffs which, in their free acid form, correspond to the formula

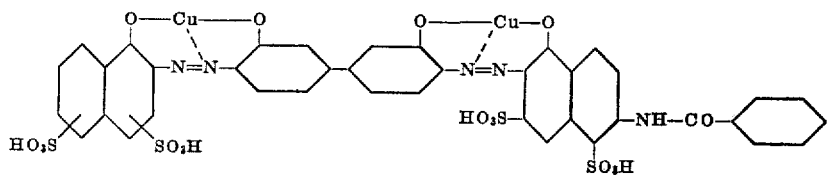

wherein

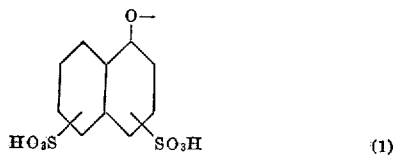

is the residue of 1-hydroxynaphthalene-3.6-disulfonic acid, 1-hydroxynaphthalene-3.8-disulfonic acid or 1-hydroxynaphthalene-4.8-disulfonic acid.

The new copper-containing disazo dyestuffs are obtained by coupling 1 mol of the tetrazo compound of 4.4'-diamino-3.3'-dimethoxy-1.1'-diphenyl in either order with 1 mol of the 1-hydroxynaphthalene disulfonic acid corresponding to formula (1) and 1 mol of 2-benzoylamino-5-hydroxynaphthalene-1.7-disulfonic acid, and treating the resulting disazo dyestuff with a copper-yielding agent under conditions which allow the splitting of the methoxy groups present in the dyestuff.

Preferred 1-hydroxynaphthalene disulfonic acids are, as indicated, 1-hydroxynaphthalene-3.6-disulfonic acid, 1-hydroxynaphthalene-3.8-disulfonic acid and 1-hydroxynaphthalene-4.8-disulfonic acid.

The coupling of the tetrazo compound with the above-named azo components is carried out preferably in a sodium bicarbonate to sodium carbonate alkaline solution. The second coupling reaction can be considerably accelerated and the yield increased when tertiary organic bases such as pyridine, quinoline or others similar to these are added to the alkaline solution.

The disazo dyestuffs can be converted into the copper complex compounds for example by heating the dyestuffs with copper salts in aqueous solution or suspension or in a concentrated aqueous solution of an alkaline salt of a low-molecular aliphatic monocarboxylic acid, or by treating the dyestuffs with complex solutions of copper salts, e. g. copper tetrammine hydroxide, in an aqueous medium, if desired in the presence of aliphatic secondary or tertiary bases such as diethanolamine or triethanolamine.

The new cupriferous disazo dyestuffs dye cotton and fibers of regenerated cellulose in bright blue shades of outstanding fastness to washing and light.

The following examples illustrate the invention without limiting its scope. All parts specified therein are by weight; all temperatures are in degrees centigrade.

Example 1

24.4 parts of 4.4'-diamino-3.3'-dimethoxy-1.1'-diphenyl are tetrazotized in the normal way and combined in the presence of sodium carbonate at a temperature of 0–5° with a solution of 46.7 parts of the sodium salt of 2-benzoylamino-5-hydroxynaphthalene - 1.7 - disulfonic acid in 500 parts of water. When the formation of the intermediate compound is completed, it is fed while in solution with a further solution of 34.8 parts of the sodium salt of 1-hydroxynaphthalene-3.6-disulfonic acid and 400 parts of water. The solution is stirred until the coupling reaction is completed; then the disazo dyestuff is isolated by an addition of sodium chloride to the coupling mass and filtered off.

For converting into the copper complex compound the moist filter-cake is added to a concentrated solution of 50 parts of crystallized copper sulfate, 100 parts of water and 350 parts of crystallized sodium acetate at 80–90°, the solution is heated further and water distilled off in sufficient quantity to allow to reach a temperature of 107°. The mass is then boiled for a further 12 hours on the reflux. In order to isolate the dyestuff, it is drop-fed with water until the salts enter into solution, whilst the dyestuff remains undissolved. This is subsequently filtered off and dried. The copper-containing disazo dyestuff corresponds to the formula

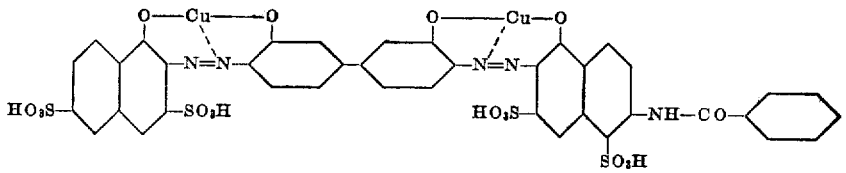

and is a dark powder which dissolves in water with a blue and in concentration sulfuric acid with a blue-green coloration, and dyes cotton and fibers of regenerated cellulose in navy blue shades of outstanding fastness to light and washing.

Example 2

24.4 parts of 4.4'-diamino-3.3'-dimethoxy-1,1'-diphenyl are tetrazotized in the normal way and combined in the presence of sodium carbonate and at a temperature of 0–5° with a solution of 34.8 parts of sodium 1-hydroxynaphthalene-3.8-disulfonate and 500 parts of water. When the formation of the intermediate compound is completed, a solution of 46.7 parts of sodium 2-benzoylamino-5-hydroxynaphthalene-1.7-disulfonate in 600 parts of water is added to the mass. To accelerate coupling, 100 to 200 parts of a mixture of pyridine bases may be added to the reaction solution. The solution is stirred until the coupling is completed, and the disazo dyestuff thus obtained is isolated by filtering off.

For converting into the copper complex compound it is dissolved in 2000 parts of water, to which solution are added at a temperature of 80–90° 10 parts of sodium carbonate and a solution of the copper tetrammine complex

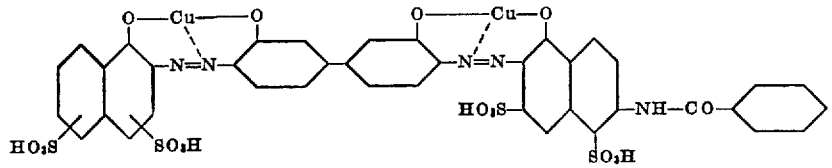

prepared from 50 parts of crystallized copper sulfate, 90 parts of concentrated ammonia and 500 parts of water. The reaction mixture is heated to the boiling point over a period of 6–12 hours under refluxing. The copper-containing disazo dyestuff is then precipitated by an addition of sodium chloride to the coppering mass, filtered off and dried. It corresponds to the formula

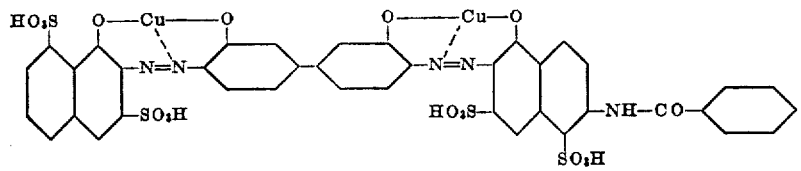

and is a dark powder which dissolves in water with a blue coloration and in concentrated sulfuric acid with a blue-green coloration, and dyes cotton and fibers of regenerated cellulose in bright blue shades of outstanding fastness to light and washing.

34.8 parts of sodium 1-hydroxynaphthalene-4.8-disulfonate can be employed with equal success in place of 34.8 parts of sodium 1-hydroxynaphthalene-3.8-disulfonate. The thus-obtained copper-containing disazo dyestuff corresponds to the formula

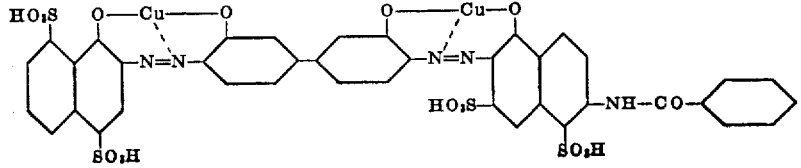

Example 3

100 parts of wetter-out cotton are entered at room temperature into a dyebath prepared with 3000 parts of water, 0.5 part of the concentrated dyestuff obtained according to Example 2, first and second paragraphs, and 10 parts of Glauber's salt. The dyebath is raised to the boil in the course of 30 minutes, during which time 10 parts of Glauber's salt are added at 40° and 10 parts at 80°. The cotton is dyed for a further 15 minutes at the boil. After this time a further 10 parts of Glauber's salt are added to the bath, which is then allowed to cool at 50° in the course of 20 minutes. The cotton is removed from the dyebath, rinsed in running water, squeezed and dried. It is dyed in a bright blue shade of outstanding fastness to light and washing.

Having thus disclosed the invention what is claimed is:

1. A copper-containing disazo dyestuff which, in its free acid form, corresponds to the formula

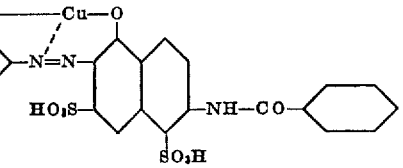

wherein

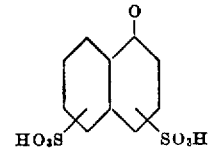

is a member selected from the group consisting of the 1-hydroxynaphthalene-3.6-disulfonic acid, 1-hydroxynaphthalene-3.8-disulfonic acid and 1-hydroxynaphthalene-4.8-disulfonic acid residues.

2. The copper-containing disazo dyestuff which, in its free acid form, corresponds to the formula

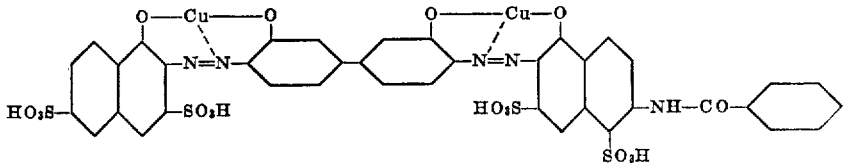

3. The copper-containing disazo dyestuff which, in its free acid form, corresponds to the formula

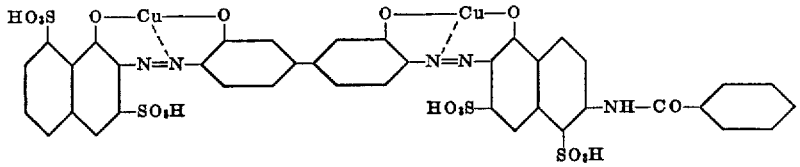

4. The copper-containing disazo dyestuff which, in its free acid form, corresponds to the formula
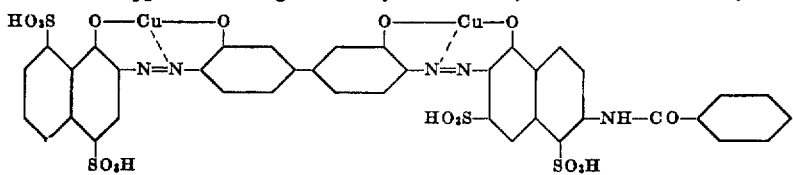
References Cited in the file of this patent
UNITED STATES PATENTS
| | | |
|---|---|---|
| 1,889,732 | Stusser et al. | Nov. 29, 1932 |
| 1,921,336 | Wiedemann et al. | Aug. 8, 1933 |
| 2,620,331 | Wehrli | Dec. 2, 1952 |

U. S. DEPARTMENT OF COMMERCE
PATENT OFFICE
CERTIFICATE OF CORRECTION

Patent No. 2,813,854                                            November 19, 1957

Ernst Iselin et al.

It is hereby certified that error appears in the printed specification of the above numbered patent requiring correction and that the said Letters Patent should read as corrected below.

Column 2, line 67, for "concentration" read -- concentrated --; column 4, line 2, for "wetter-out" read -- wetted-out --.

Signed and sealed this 8th day of April 1958.

(SEAL)
Attest:

KARL H. AXLINE                                           ROBERT C. WATSON
Attesting Officer                                    Commissioner of Patents